United States Patent
Bryson

(10) Patent No.: US 8,745,000 B2
(45) Date of Patent: Jun. 3, 2014

(54) PRIVATE DATABASE LOGGING WITH MINIMAL STORAGE REQUIREMENTS

(75) Inventor: Donald L. Bryson, Chattanooga, TN (US)

(73) Assignee: International Business Machines Corporation, Armonk, NY (US)

(*) Notice: Subject to any disclaimer, the term of this patent is extended or adjusted under 35 U.S.C. 154(b) by 887 days.

(21) Appl. No.: 12/916,360

(22) Filed: Oct. 29, 2010

(65) Prior Publication Data

US 2012/0109893 A1    May 3, 2012

(51) Int. Cl.
*G06F 17/00* (2006.01)

(52) U.S. Cl.
USPC .......................................................... 707/634

(58) Field of Classification Search
None
See application file for complete search history.

(56) References Cited

U.S. PATENT DOCUMENTS

| | | | | |
|---|---|---|---|---|
| 4,945,474 A * | 7/1990 | Elliott et al. | ..................... | 714/16 |
| 5,832,508 A * | 11/1998 | Sherman et al. | ...................... | 1/1 |
| 5,982,890 A | 11/1999 | Akatsu | | |
| 6,067,540 A * | 5/2000 | Ozbutun et al. | ........................ | 1/1 |
| 6,275,824 B1 | 8/2001 | O'Flaherty et al. | | |
| 6,993,530 B2 * | 1/2006 | Lee et al. | ....................... | 707/769 |
| 7,305,421 B2 * | 12/2007 | Cha et al. | .............................. | 1/1 |
| 7,620,660 B2 * | 11/2009 | Kodavalla et al. | ..................... | 1/1 |
| 2003/0037321 A1 * | 2/2003 | Bowen | ......................... | 717/149 |
| 2003/0140043 A1 | 7/2003 | Hotchkiss et al. | | |
| 2003/0149683 A1 * | 8/2003 | Lee et al. | .......................... | 707/1 |
| 2006/0212491 A1 | 9/2006 | Agrawal et al. | | |
| 2006/0229909 A1 | 10/2006 | Kaila et al. | | |
| 2007/0005664 A1 * | 1/2007 | Kodavalla et al. | ............. | 707/202 |
| 2007/0067357 A1 | 3/2007 | Clark | | |
| 2008/0046480 A1 | 2/2008 | Lou | | |
| 2008/0103833 A1 | 5/2008 | Miglietta et al. | | |
| 2010/0169975 A1 * | 7/2010 | Stefanidakis et al. | .......... | 726/25 |
| 2012/0005158 A1 * | 1/2012 | Bhatt et al. | ..................... | 707/609 |

FOREIGN PATENT DOCUMENTS

| | | |
|---|---|---|
| JP | 2001256247 A | 9/2001 |
| JP | 2009193153 A | 8/2009 |
| WO | 2007028160 A1 | 3/2007 |

OTHER PUBLICATIONS

ApexSQL Audit 2008 for Microsoft SQL Server; The Industry Standard for Active SQL Server Database Auditing, http://www.apexsql.com/datasheets/apexsql_audit_datasheet.pdf; 2008.

Craig S. Mullins, Database Auditing and Compliance in a Mainframe Environment, Neon Enterprise Software, Inc. http://www.craigsmullins.com/DBAuditing_wp.pdf, Aug. 2008.

(Continued)

*Primary Examiner* — Hung Le
(74) *Attorney, Agent, or Firm* — Kunzler Law Group

(57) ABSTRACT

An apparatus, system, and method are disclosed for logging operations for a database. An operation event module detects an operation on a record in a database table. A translation module creates a changed field bit field, one or more operation time bit fields, and a user bit field. The translation module creates the changed field bit field by encoding indicators of one or more fields of the record that the operation is configured to change, creates the one or more operation time bit fields by encoding time information for the operation, and creates the user bit field by encoding information of a user associated with the operation. A consolidation module packs at least the changed field bit field, the one or more operation time bit fields, and the user bit field into a single bit array. A log module stores the bit array in a change log.

25 Claims, 9 Drawing Sheets

(56) References Cited

OTHER PUBLICATIONS

Wikipedia, Sarbanes-Oxley Act, http://en.wikipedia.org/wiki/Sarbanes%E2%80%93Oxley_Act, Retrieved: Aug. 20, 2010.

Wentian Lu and Gerome Miklau, Auditing a Database Under Retention Restrictions, http://www.cs.umass.edu/~miklau/pubs/icde09/lu09auditing.pdf, 2009.

ASP Free, Buliding an Audit trail for Your Data, http://www.aspfree.com/c/a/Database/Building-an-Audit-Trail/, 2003.

Audit Tools, AuditDatabase.com, http://www.auditdatabase.com/AuditTools.html, Last Site Update: Aug. 3, 2009.

Data Integrity: Security's Most Strategic Element, http://www.busmanagement.com/article/Data-Integrity-Securitys-Most-Strategic-Element/ 2010. (Document available at least before Aug. 20, 2010).

Database Activity Monitoring, Audit Database Access and Usage of Sensitive Data, IMPERVA, http://www.imperva.com/products/database-activity-monitoring.html, retrieved 2010. (Document available at least before Aug. 20, 2010).

Oracle Database, Standard Database Auditing, http://www.oracle.com/technology/deploy/security/database-security/database-auditing/index.html, May 16, 2008.

Noyes, Data Storage Architecture with SQL Server 2005 Company Edition, Microsoft SQL Server Technical Article, Feb. 2007.

* cited by examiner

400

Table Control Table 402

| Table_ID 408 | Table_Name 410 | Tracked_Fields 412 | Start_Date 414 | Retention_Time 416 |
|---|---|---|---|---|
| 1 | Patient | 01111 | 01/01/2010 | 365 |

Field Control Table 404

| Table_ID 408 | Field_ID 418 | Field_Name 420 |
|---|---|---|
| 1 | 1 | Patient_ID |
| 1 | 2 | First_Name |
| 1 | 3 | Last_Name |
| 1 | 4 | Diagnosis |
| 1 | 5 | Status |

User Control Table 406

| User_ID 422 | Username 424 |
|---|---|
| 1 | APP_USER1 |
| 2 | DBA |
| 3 | AUDITOR |
| 4 | APP_USER2 |

FIG. 4

500 ↘ 502  504  506  508
01/01/10 - 06:00 - APP_USER1:> INSERT INTO Patient VALUES
(1, 'John', 'Doe', 'H1N1', 'hospitalized');

510 ↘ 512            514           516          518
Day: 000000000  Hour: 00110  User: 0001  Fields: 1111

Change Log
Table
520

| Log_ID 522 | Patient_ID 524 | Bit_Array 526 |
|---|---|---|
| 1 | 1 | 000000000000011000011111 |

530 ↘ 502  504  506  508
01/02/10 - 07:00 - APP_USER2:> UPDATE Patient SET status= 'discharged'
WHERE Patient_ID=1;

540 ↘ 512            514           516          518
Day: 000000001  Hour: 00111  User: 0010  Fields: 0001

Change Log
Table
520

| Log_ID 522 | Patient_ID 524 | Bit_Array 526 |
|---|---|---|
| 1 | 1 | 000000000000011000011111 |
| 2 | 1 | 000000000100111001000001 |

550 ↘  502  504  506  508
01/03/10 - 17:00 – DBA :> SELECT * FROM Patient WHERE Patient_ID=1;

560 ↘  512                514              516              518
Day: 000000010   Hour: 10001   User: 0011   Fields: 0000

Change Log
Table
520

| Log_ID 522 | Patient_ID 524 | Bit_Array 526 |
|---|---|---|
| 1 | 1 | 000000000011000011111 |
| 2 | 1 | 000000010011100100001 |
| 3 | 1 | 000000101000100110000 |

FIG. 5C

570 ↘  512                514              516              518
Day: 000000010   Hour: 10001   User: 0011   Fields: 0000

536 Operation Type: 11

Change Log
Table
520

| Log_ID 522 | Patient_ID 524 | Bit_Array 526 |
|---|---|---|
| 1 | 1 | 000000000001100001111100 |
| 2 | 1 | 000000001001110010000101 |
| 3 | 1 | 000000010100010011000011 |

FIG. 5D

PRIVATE DATABASE LOGGING WITH MINIMAL STORAGE REQUIREMENTS

FIELD

The subject matter disclosed herein relates to database logging and more particularly relates to database logging that prohibits the exposure of private information.

BACKGROUND

Description of the Related Art

Database systems are used to store and organize data in many industries. Database systems often store financial records, medical histories, commercial transactions, and other potentially sensitive information. Sensitive information may be regulated by legal requirements or industry regulations, such as the Sarbanes Oxley Act, the Health Insurance Portability and Accountability Act ("HIPAA"), the Payment Card Industry Data Security Standard ("PCI DSS"), or the like. Although certain privacy rules may be mandated for a database system, similar legal requirements or industry regulations may also require auditing of the data in a database system to guarantee the data's accuracy, or the like.

Additionally, many database systems store large amounts of data and process many transactions a day. Logging or tracking each operation on a large database system can use a prohibitively large amount of storage space for log data, making it difficult to monitor transactions of large or busy database systems.

BRIEF SUMMARY

From the foregoing discussion, it should be apparent that a need exists for an apparatus, method, and computer program product that log operations for a database in a private manner. Beneficially, such an apparatus, method, and computer program product would have minimal storage requirements.

The present invention has been developed in response to the present state of the art, and in particular, in response to the problems and needs in the art that have not yet been fully solved by currently available database logging methods. Accordingly, the present invention has been developed to provide an apparatus, method, and computer program product for logging operations for a database that overcome many or all of the above-discussed shortcomings in the art.

The apparatus to log operations for a database is provided with a plurality of modules configured to functionally execute the necessary steps of database operation logging. These modules in the described embodiments include an operation event module, a translation module, a consolidation module, and a log module.

The operation event module, in one embodiment, detects an operation on a record in a database table. The translation module, in a further embodiment, creates a changed field bit field, one or more operation time bit fields, and a user bit field. The translation module, in one embodiment, creates the changed field bit field by encoding indicators of one or more fields of the record that the operation is configured to change. In another embodiment, the translation module creates the one or more operation time bit fields by encoding time information for the operation. The translation module, in a further embodiment, creates the user bit field by encoding information of a user associated with the operation.

The consolidation module, in one embodiment, packs at least the changed field bit field, the one or more operation time bit fields, and the user bit field into a single bit array. In a further embodiment, the log module stores the bit array in a change log in a way that the bit array is associated, in the change log, with the record.

A method of the present invention is also presented for logging operations for a database. The method in the disclosed embodiments substantially includes the steps necessary to carry out the functions presented above with respect to the operation of the described apparatus.

In one embodiment, the method includes detecting an operation on a record in a database table. The method, in a further embodiment, includes creating a changed field bit field by encoding indicators of one or more fields of the record that the operation is configured to change. In another embodiment, the method includes creating one or more operation time bit fields by encoding time information for the operation. In one embodiment, the method includes creating a user bit field by encoding information of a user associated with the operation.

The method, in one embodiment, includes packing at least the changed field bit field, the one or more operation time bit fields, and the user bit field into a single bit array. In another embodiment, the method includes storing the bit array in a change log such that the bit array is associated with the record.

A computer program product of the present invention is also presented for logging operations for a database. The computer program product in the disclosed embodiments substantially includes the steps necessary to carry out the functions presented above with respect to the operation of the described apparatus and method. The computer program product, in one embodiment, includes a computer readable medium having computer readable program code executing to perform operations for logging operations for a database.

In one embodiment, the operations include detecting an operation on a record in a database table. In a further embodiment, the operations include creating a changed field bit field by encoding indicators of one or more fields of the record that the operation is configured to change. The operations, in another embodiment, include creating one or more operation time bit fields by encoding time information for the operation. In one embodiment, the operations include creating a user bit field by encoding information of a user associated with the operation.

In one embodiment, the operations include packing at least the changed field bit field, the one or more operation time bit fields, and the user bit field into a single bit array. The operations, in another embodiment, include storing the bit array in a change log such that the bit array is associated with the record.

Another method of the present invention is presented for deploying computing infrastructure. The method, in one embodiment, includes integrating computer readable code into a computing system. The computer readable code in combination with the computing system, in one embodiment, is capable of detecting an operation on a record in a database table. The computer readable code in combination with the computing system, in another embodiment, is capable of creating a changed field bit field by encoding indicators of one or more fields of the record that the operation is configured to change. In a further embodiment, the computer readable code in combination with the computing system is capable of creating one or more operation time bit fields by encoding time information for the operation. In one embodiment, the computer readable code in combination with the computing system is capable of creating a user bit field by encoding information of a user associated with the operation.

In another embodiment, the computer readable code in combination with the computing system is capable of packing at least the changed field bit field, the one or more operation time bit fields, and the user bit field into a single bit array. The computer readable code in combination with the computing system, in one embodiment, is capable of storing the bit array in a change log such that the bit array is associated with the record.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating one embodiment of control data in accordance with the present invention;

FIG. 5A is a schematic block diagram illustrating one embodiment of a database operation, bit fields, and a change log in accordance with the present invention;

FIG. 5B is a schematic block diagram illustrating another embodiment of a database operation, bit fields, and a change log in accordance with the present invention;

FIG. 5C is a schematic block diagram illustrating a further embodiment of a database operation, bit fields, and a change log in accordance with the present invention;

FIG. 5D is a schematic block diagram illustrating another embodiment of bit fields and a change log in accordance with the present invention;

DETAILED DESCRIPTION

Figure 1:
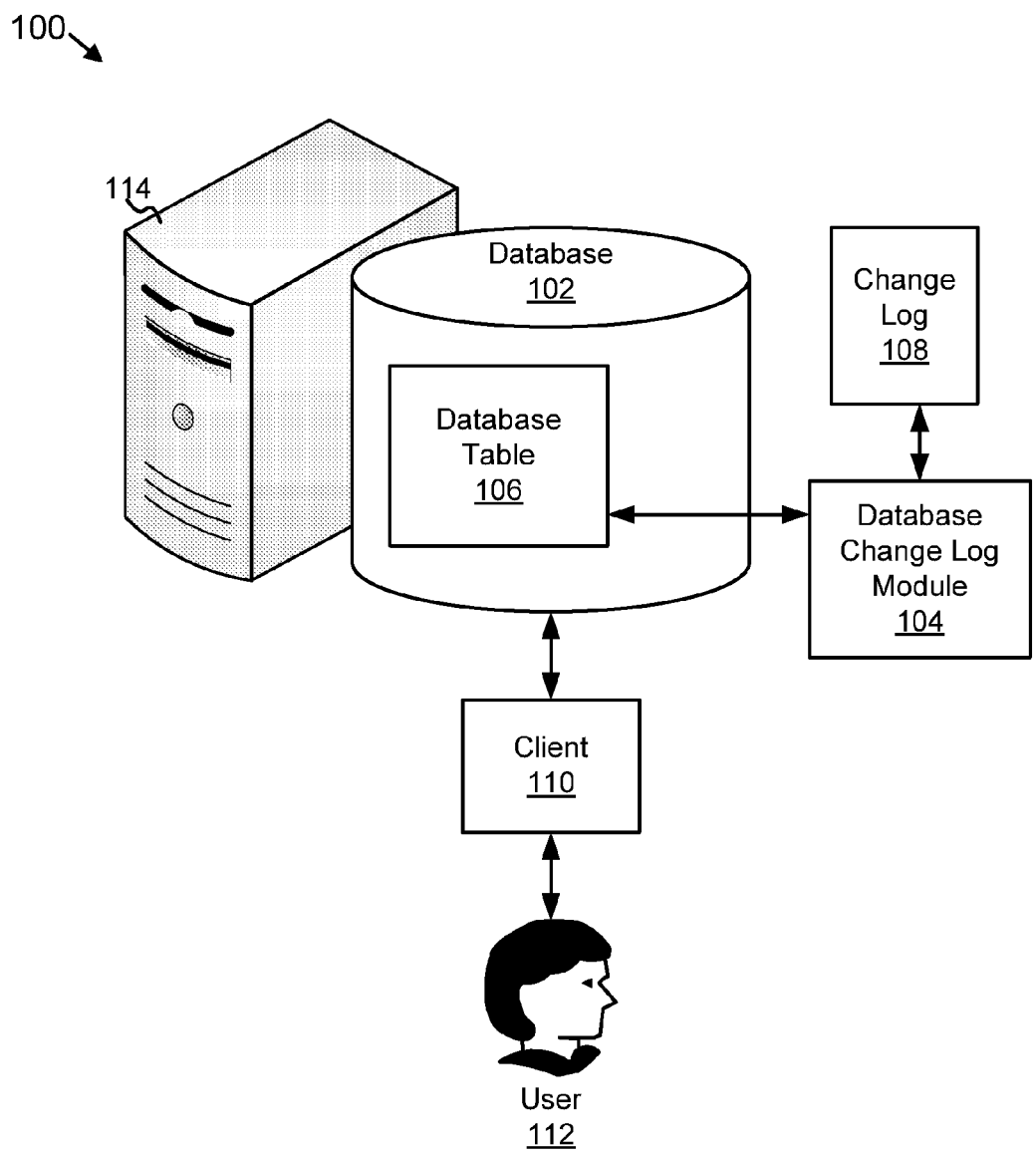
FIG. 1 is a schematic block diagram illustrating one embodiment of a system to log operations for a database in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the C programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 to log operations for a database 102. The system 100, in one embodiment, logs operations for the database 102 using compact bit arrays to reduce data storage requirements for log information. In a further embodiment, the system 100 provides separate access privileges for user data and log data, so that certain users have access rights to log data but not to user data. The depicted embodiment includes a database server computer 114, the database 102, a database change log module 104, a database table 106, a change log 108, a client 110, and a user 112.

In one embodiment, the database server computer 114 hosts a database system of the database 102 and provides access to the database 102. The database server computer 114, in various embodiments, may include a dedicated server computer, a blade server, a desktop computer, a server farm, and/or another computing device with a processor and memory that is capable of hosting a database system.

The database 102, in various embodiments, may use various models for the database table 106, such as a relational model, a flat file model, a hierarchical model, a dimensional model, a network model, an object-oriented model, an associative model, a concept-oriented model, a multidimensional model, a semantic model, a star schema model, an extensible markup language ("XML") model, and/or another model. The database table 106, in one embodiment, is an organized set of related data that the database 102 stores. In one embodiment, the database table 106 includes one or more records and each record has one or more fields. In the database table 106, in a further embodiment, each record may be referred to as a row in the database table 106 and each field may be referred to as a column in the database table 106, or the like. The database 102, in one embodiment, includes multiple database tables 106 and each database table 106 includes multiple records.

The database 102, in one embodiment, supports one or more operations on database tables 106. Database operations, in a further embodiment, have a predefined format or language. Examples of database languages, in various embodiments, include structured query language ("SQL"), XQuery, datalog, and the like. The database server computer 114, in one embodiment, provides the client 110 access to the database 102. In one embodiment, the database server computer 114 provides the client 110 access to the database 102 locally and the client 110 includes database client software executing on the database server computer 114. In a further embodiment, the database server computer 114 provides the client 110 access to the database 102 over a data network, and the client 110 includes a remote computing device with database client software executing on the remote computing device.

The client 110, in one embodiment, performs operations on one or more database tables 106 of the database 102. Each operation, in one embodiment, is associated with a user 112. The user 112, in one embodiment, represents a user account defined for the database 102 with associated access permissions, and the like. A user account may be associated with a single user 112, with a group of users 112, or the like. The user 112, in one embodiment, may input an operation directly into the client 110 for execution in the database 102 and the client 110 may initiate the operation in response to input from the user 112.

In another embodiment, the user 112 may cause a script or other executable code to perform an operation on the database 102 using a user account of the user 112. Such a script or other executable code may perform an operation in response to input from the user 112, periodically as a cron job or other scheduled task, in response to a trigger or event, or the like. An operation on the database 102, in one embodiment, is associated with a user 112 even if executed as part of a script or other executable code that may not be directly initiated by the user 112. For example, in one embodiment, cron jobs or other scheduled tasks may be associated with a user 112 and executed with permissions associated with the user 112, or the like.

In one embodiment, the database change log module 104 tracks operations on records of one or more database tables 106 in the database 102. The database change log module 104, in one embodiment, stores information of the operations in the change log 108. The change log 108, in various embodiments, may include a change log database table in the database 102, a change log field in a tracked database table 106, a flat file, and/or another type of log. The database change log module 104, in one embodiment, stores information of an operation as a bit array, to reduce size requirements of change log data. The reduction in size requirements, in one embodiment, may be substantial for large databases 102 with many transactions.

In one embodiment, the database change log module 104 creates bit fields to represent information of a detected operation, such as fields that the operation changed, a time of the operation, the user 112 associated with the operation, and the like, and packs the separate bit fields into a single bit array for storage in the change log 108. The database change log module 104, in one embodiment, may be configured by a user 112 to track certain fields and not other fields, certain database tables 106 and not other database tables 106, or the like.

In one embodiment, a bit field, as used herein is a fixed sized binary representation of data as a string of bits. A bit field may include one or more bit flags, may represent data as a pattern of multiple bits, may represent data as a binary number, or the like using a known number of bits. In one embodiment, as used herein, a bit array is a collection of several bit fields into a larger string of bits having a fixed or known size. Each bit field in a bit array, in a further embodiment, has a known position or offset within the bit array, allowing access to separate bit fields within the bit array separately based on the known position or offset.

Bit fields and bit arrays, in one embodiment, may store data more compactly using a fewer number of bits than other data types or data structures because each bit field or bit array can be individually sized to store just a selected amount of data and no more. In a further embodiment, storing bit fields in a bit array may also reduce metadata overhead of storing the data represented by the bit fields separately. In another embodiment, the database change log module 104 may encode change log data into bit fields to reduce a storage size of the change log data.

The database change log module 104, in a further embodiment, stores the change log 108 separately from tracked database tables 106, and provides separate access permissions and usage rights for the change log 108 and tracked database tables 106. In one embodiment, the database change log module 104 does not store base data from the database table 106 (such as original data, change data, and the like) in the change log 108, to keep the base data private, secure, and/or otherwise separate from the change log 108. For example, a database table 106 may include sensitive data such as financial records, medical records, or the like.

Keeping change log data in the change log 108 separate from production data or other base data in a database table 106, in one embodiment, allows various support personnel or other users 112 to access the change log 108, for auditing purposes or the like, while keeping sensitive data in the database table 106 private. Such a separation, in certain embodiments, may satisfy legal requirements or industry regulations, such as the Sarbanes Oxley Act, the Health Insurance Portability and Accountability Act ("HIPAA"), the Payment Card Industry Data Security Standard ("PCI DSS"), or the like, that mandate certain privacy rules or user access roles.

The database change log module 104, in one embodiment, is integrated with a database management system ("DBMS") or other database system that manages the database 102. In a further embodiment, the database change log module 104 is implemented separately from a DBMS of the database 102. For example, the database change log module 104, in one embodiment, may include a computer program of executable code in communication with a DBMS of the database 102.

The database change log module 104, in various embodiments, may include a DBMS plug-in or extension, an operation parsing program, one or more audit triggers, a packet sniffing program on a data network with the database server computer 114, a component of a client 110 database access program, or the like. In a further embodiment, a user 112 such as a database administrator, database service provider, or the like deploys the database change log module 104 as computing infrastructure by installing or otherwise integrating computer readable code with the database server computer 114, a client computer 110, and/or another computing system.

Figure 2:
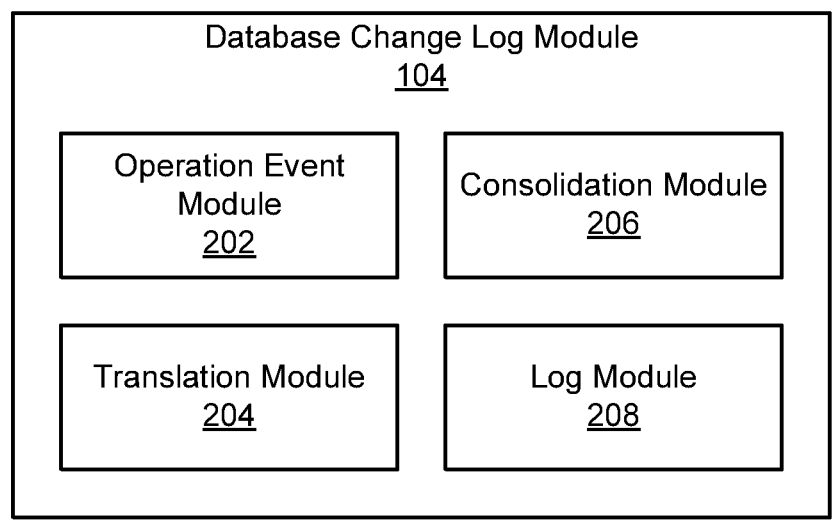
FIG. 2 is a schematic block diagram illustrating one embodiment of a database change log module in accordance with the present invention.

FIG. 2 depicts one embodiment of the database change log module 104. In one embodiment, the database change log module 104 is substantially similar to the database change log module 104 described above with regard to FIG. 1. The database change log module 104, in the depicted embodiment, includes an operation event module 202, a translation module 204, a consolidation module 206, and a log module 208.

In one embodiment, the operation event module 202 detects an operation on a record in a database table 106. The operation event module 202, in one embodiment, is integrated with a DBMS or other database system, and detects operations natively as they are submitted to the DBMS. In a further embodiment, the operation event module 202 may be implemented separate from a DBMS or other database system associated with the database 102. In one embodiment, the operation event module 202 uses either manually created or tool generated audit triggers to detect operations on the database 102. In another embodiment, the operation event module 202 includes a packet sniffing utility that monitors one or more communications ports associated with the database 102 to detect database operations in data packets sent to the database server computer 114 over a data network. The operation event module 202, in a further embodiment, scans a database log maintained by a DBMS or other database system of the database 102 to detect operations on a database table 106. In one embodiment, the operation event module 202 may include a plug-in or extension of a DBMS or other database system.

The operation event module 202, in one embodiment, may be configured to detect certain types of operations. For example, the operation event module 202, in one embodiment, may detect persistent data manipulation language ("DML") operations that change records in a database table 106, but not other operations that do not change records in the database table 106. In another embodiment, the operation event module 202 may detect both operations that change records and operations that do not change records. Persistent DML operations that change records, in one embodiment, include operations such as insert, update, and delete operations that add, change, remove, or otherwise modify records in a database table 106. Operations that do not change records, in one embodiment, include operations such as select operations that are read-only and do not modify records in a database table 106.

In one embodiment, the operation event module 202 may be configured to detect selected types of operations based on input from a user 112, control data, or another configuration tool for the database change log module 104. In a further embodiment, the operation event module 202 may be configured to detect operations for selected database tables 106, to detect operations associated with specific predefined fields of a database table 106, or the like. The operation event module 202, in another embodiment, parses through operations on the database 102 to find specific operations that the operation event module 202 has been configured to detect. The operation event module 202, in one embodiment, communicates information of detected operations to the translation module 204 or otherwise makes information of detected operations available to the translation module 204.

In one embodiment, the translation module 204 translates information associated with operations that the operation event module 202 detects to change log information for the change log 108. The translation module 204, in a further embodiment, translates the information of operations by creating compact bit fields representing the information. The translation module 204, in one embodiment, creates bit fields by encoding information of an operation based on control data. The operation event module 202, in one embodiment, parses predefined information from detected operations and provides the predefined information to the translation module 204. In a further embodiment, the operation event module 202 provides detected operations and associated information to the translation module 204 and the translation module 204 parses predefined information from the detected operations and associated information.

In one embodiment, the translation module 204 creates a changed field bit field based on one or more fields of a record that a detected operation changes. The translation module 204, in one embodiment, creates a changed field bit field by encoding indicators of the fields, such as field names, field positions, or the like. The encoding by the translation module 204, in one embodiment, compacts the indicators of the fields into the changed field bit field. The translation module 204, in one embodiment, determines which fields a detected operation changes based on the detected operation itself. In a further embodiment, the translation module 204 compares data of the record before a detected operation to data of the record after the detected operation to determine which fields the detected operation changed.

For example, in one embodiment, a detected operation includes names of one or more fields that the operation is configured to change. The translation module 204, in a further embodiment, may encode the field names in a changed field bit field where each bit of the changed field bit field represents a field of a corresponding record in the database table 106. In one embodiment, a change field bit field is a bitwise representation of fields that a detected operation is configured to change and that are selected for tracking by the database change log module 104. Each bit in a change field bit field, in a further embodiment, indicates whether or not a detected operation is configured to change an associated selected tracked field of a record. A change field bit field, in another embodiment, excludes bits for untracked fields to reduce a size of the change field bit field.

The translation module 204, in one embodiment, sets the bits corresponding to fields that the operation is configured to change to a predefined value, such as a binary one, or the like, while setting other bits to an opposite value, such as a binary zero, or the like. For a read-only operation, such as a select operation or the like, in one embodiment, the translation module 204 creates a changed field bit field indicating that the operation changed no fields of the record, such as all binary zeroes, all binary ones, or the like. In other embodiments, the translation module 204 may otherwise encode and compact field indicators into a changed field bit field for storing in the change log 108.

The translation module 204, in another embodiment, creates one or more operation time bit fields based on time information for a detected operation. In one embodiment, the translation module 204 creates one or more operation time bit fields by encoding time information for a detected operation, such as a day, an hour, a time, or the like, into the one or more operation time bit fields. In one embodiment, the one or more operation time bit fields include a single bit field indicating a time of a detected operation. In a further embodiment, the one or more operation time bit fields include separate bit fields for different time data, such as a bit field for the day, a bit field for the hour, etc.

In one embodiment, the translation module 204 encodes at least one of the one or more operation time bit fields as an offset from a start date or time. For example, in one embodiment, the translation module 204 may encode the date of a detected operation as a binary offset from a start date, or the like. A size for an operation time bit field representing an offset, in one embodiment, may be set based on a retention time for the associated database table 106, for the change log 108, or the like, to minimize the number of bits in the operation time bit field. Other operation time bit fields, in embodiments that include them, may encode an hour of the day, a number of minutes, a number of seconds, and/or other time information.

In one embodiment, the one or more operation time bit fields include a date operation time bit field that represents a date of a corresponding operation. A date operation time bit field, in one embodiment, includes a binary representation of an offset number of days between a start date and the date of a corresponding operation. For example, if the start date is May 7 and an operation was performed on July 18, in one embodiment, a date operation time bit field for the operation includes a binary representation of the number 72, such as "001001000" or the like. In a further embodiment, a date operation time bit field has a number of bits that is selected based on a predefined retention period for data in the change log 108. For example, the binary representation of "001001000" for the number 72 used above includes nine bits, and can encode offsets between 0 and 511. For a retention period greater than 511 days, in one embodiment, a number of bits greater than nine may be used for a date operation time bit field.

In another embodiment, the one or more operation time bit fields include a time operation time bit field that includes a binary representation of a time of day for a detected operation. A time operation time bit field, in various embodiments, may include an hour of a detected operation, a minute of a detected operation, a second of a detected operation, and/or other time of day information for a detected operation. In one embodiment, a time operation time bit field is a single bit field that encodes an hour of day that a corresponding detected operation occurred.

In one embodiment, the translation module 204 creates a user bit field based on a user 112 associated with a detected operation. The translation module 204, in a further embodiment, creates a user bit field by encoding information of the associated user 112. For example, the translation module 204, in various embodiments, may encode a username, a user id, or other identifying user information. In one embodiment, the translation module 204 looks up a username or other identifying user information in control data to match the username with a user number and encodes the user number as a user bit field. The user number, in one embodiment, is a minimal number (i.e. no greater than a total number of users 112 associated with a database table 106). The translation module 204, in a further embodiment, sizes the user bit field based on a number of users 112, such as a total current number of users 112, a predefined maximum number of users 112, or the like, selecting a minimal number of bits capable of storing the user numbers.

The translation module 204, in one embodiment, creates an operation type bit field based on an operation type for a detected operation. In a further embodiment, the translation module 204 encodes the operation type into an operation type bit field. For example, in one embodiment, the translation module 204 represents different operation types using different binary patterns or numbers. The number of binary bits in an operation type bit field, in one embodiment, is selected based on a number of operations that the operation event module 202 is configured to detect, to minimize a size of the operation type bit field.

The number and/or type of bit fields that the translation module 204 creates, in certain embodiments, may be configurable by a user 112, such as a database administrator, a system administrator, or the like. In a further embodiment, the translation module 204 may create one or more bit fields differently for different types of operations, may create different bit fields for different types of operations, and/or may otherwise handle different types of operations differently. For example, in one embodiment, the translation module 204 may omit certain bit fields for certain operation types, such as omitting a changed field bit field for read-only operations, or the like. The translation module 204, in one embodiment, may omit a certain bit field for an operation type when entries in the change log 108 may have variable sizes. In other embodiments, where each entry or bit array in the change log 108 has a fixed size, the translation module 204 may include each defined bit field for each operation type, whether the bit field is applicable or not.

In one embodiment, the consolidation module 206 packs bit fields that the translation module 204 creates into a single bit array. In a further embodiment, each bit field has a predefined size, and the consolidation module 206 packs the bit fields in a predefined order, facilitating unpacking of the bit array. The consolidation module 206, in another embodiment, indexes the bit fields, such that each bit field has a predefined offset within the bit array. The consolidation module 206, in one embodiment, packs at least a changed field bit field, one or more operation time bit fields, and a user bit field into the single bit array for a detected operation. In other embodiments, the consolidation module 206 may pack an operation type bit field and/or other bit fields associated with an operation into the single bit array with the changed field bit field, the one or more operation time bit fields, and the user bit field.

In one embodiment, the log module 208 stores bit arrays that the consolidation module 206 creates in the change log 108. The log module 208, in one embodiment, stores the bit arrays in a change log database table 108 in the database 102. A change log database table 108, in one embodiment, has separate user access rights than monitored database tables 106. In another embodiment, the log module 208 stores each bit array in a monitored database table 106 as a field in a record corresponding to the bit array (i.e. the record on which a detected operation corresponding to the bit array was configured to operate).

The log module 208, in one embodiment, associates a bit array in the change log 108 with a record corresponding to the bit array. In one embodiment, the log module 208 stores a record indicator and a log indicator with each bit array in a change log database table 108. In a further embodiment, the log module 208 stores a record indicator, a log indicator, and a bit array as separate fields in a change log database table 108. A record indicator, in one embodiment, identifies a record that a corresponding operation is on, such as a key or another identifier for the record. A log indicator, in one embodiment, is a key or other identifier that uniquely indentifies a bit array and a record indicator in the change log database table 108.

In a further embodiment, the log module 208 associates a bit array with a corresponding record by storing the bit array as a field of the corresponding record in a database table 106 of the corresponding record. In one embodiment, a change log field of a record in a monitored database table 106 stores a single bit array with information of a most recent operation on the record. In a further embodiment, a change log field of a record in a monitored database table 106 has a complex data type capable of storing multiple bit arrays, such as a multi-value field, an embedded table, an embedded list, or the like.

Figure 3:
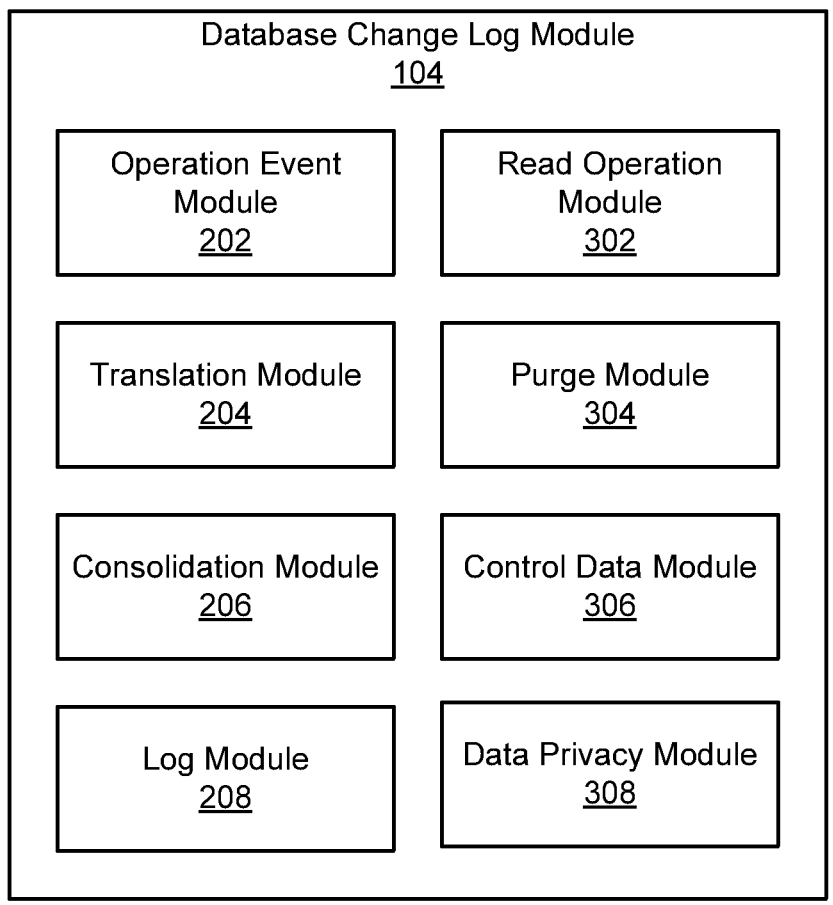
FIG. 3 is a schematic block diagram illustrating another embodiment of a database change log module in accordance with the present invention.

FIG. 3 depicts another embodiment of the database change log module 104. The database change log module 104, in the depicted embodiment, includes the operation event module 202, the translation module 204, the consolidation module 206, and the log module 208, as described above with regard to FIG. 2. The database change log module 104, in the depicted embodiment, further includes a read operation module 302, a purge module 304, a control data module 306, and a data privacy module 308.

In one embodiment, the read operation module 302 detects read-only operations that are not configured to change a field of a record in a tracked database table 106, such as select operations and/or other read-only operations. The read operation module 302, in one embodiment, detects read-only operations as part of or in conjunction with the operation event module 202, as described above with regard to FIG. 2. In one embodiment, whether the database change log module 104 tracks and logs read-only operations using the read operation module 302 or tracks and logs only persistent DML operations that change records is a user configurable setting.

In one embodiment, the translation module 204, the consolidation module 206, and the log module 208 work with the read operation module 302 to track and log read-only operations. For example, in one embodiment, the translation module 204 creates a changed field bit field, one or more operation time bit fields, and/or a user bit field for each detected read-only operation, the consolidation module 206 packs the changed field bit field, the one or more operation time bit fields, and/or the user bit field into a bit array, and the log module 208 stores the bit array in the change log 108.

In one embodiment, the translation module 204 creates an operation type bit field for each detected read-only operation. In another embodiment, the translation module 204 creates a changed field bit field for each detected read-only operation and the changed field bit fields indicate that the read-only operations did not change any fields of records in tracked database tables 106. In a further embodiment, the translation module 204 does not create changed field bit fields for read-only operations.

In one embodiment, the purge module 304 purges or expires log data from the change log 108 based on age. For example, in a further embodiment, the purge module 304 removes log data entries from the change log 108 that are older than a predefined retention period. A predefined retention period, in one embodiment, defines an amount of time that the database change log module 104 should retain records of an operation after the operation has occurred. The purge module 304, in a further embodiment, may maintain several different predefined retention periods, for different database tables 106, for different operation types, or the like. In other embodiments, the purge module 304 may manage log data entries as a first-in-first-out ("FIFO") queue, or the like, keeping a predefined number of data entries in the change log 108 instead of purging at a certain age and expiring older entries when new entries above the predefined number are added to the change log 108.

In one embodiment, the purge module 304 removes a stored bit array from the change log 108 in response to an operation time bit field of the stored bit array indicating that the stored bit array is older than a predefined retention period. A bit array, in various embodiments, may be older than a predefined retention period, if the operation time bit field of the bit array matches the predefined retention period, if the operation time bit field of the bit array is earlier than the predefined retention period, and/or if the operation time bit field of the bit array has another predetermined relationship with the predefined retention period.

The purge module 304, in one embodiment, checks the change log 108 for stored bit arrays older than a predefined retention period periodically at a predefined interval. In another embodiment, the purge module 304 checks the change log 108 for stored bit arrays older than a predefined retention period in response to adding a new bit array to the change log 108, adding a bit array with a new offset as an operation time bit field, and/or in response to another change log event. In a further embodiment, the purge module 304 checks the change log 108 for stored bit arrays corresponding to a specific record in a database table 106 that are older than a predefined retention period in response to the operation event module 202 detecting an operation on the specific record. In one embodiment, the purge module 304 checks the change log 108 for stored bit arrays older than a predefined retention period opportunistically, based on a load of the database server computer 114, during off-peak hours, or the like.

The purge module 304, in one embodiment, re-encodes the operation time bit fields of other bit arrays in the change log 108 in response to removing bit arrays older than the predefined retention period. For example, in one embodiment, the purge module 304 may reset a start date for the change log 108, for a tracked database table 106, or the like, and may re-encode operation time bit fields from offsets based on an original start date to offsets based on a new start date associated with a predefined retention period. In one embodiment, the purge module 304 subtracts a predefined retention period from the current date to determine a new start date. In a further embodiment, the purge module 304 may use a date of the oldest bit array remaining in the change log 108 as the start date, or the like.

In one embodiment, the purge module 304 removes a stored record from a tracked database table 106 if the database change log module 104 has not tracked a change for the stored record within the predefined retention period. For example, in certain embodiments, the base records of a tracked database table 106 itself may be irrelevant or unnecessary if no operations have been tracked for the base records within the predefined retention period. In a further embodiment, the purge module 304 removes a stored record from a tracked database table 106 in response to time indicators of each stored bit array associated with the stored record indicating that the stored bit arrays are older than the predefined retention period. The purge module 304, in one embodiment, may remove the bit arrays prior to removing the stored record corresponding to the bit arrays, and may remove the stored record in response to removing each of the bit arrays from the change log 108 such that no bit arrays are stored in the change log 108 for the stored record, or may otherwise remove a stored record in response to bit arrays for the stored record being older than the predefined retention period.

In one embodiment, a size of at least one operation time bit field of a bit array is selected based on a predefined retention period. The size of an operation time bit field, in one embodiment, may be selected to store an offset at least as great as the predefined retention period for the bit array. Re-encoding operation time bit fields, in a further embodiment, ensures that offsets of operation time bit fields do not exceed the storage capacity of the number of bits allotted to an operation time bit field.

In one embodiment, the control data module 306 determines control data for the database change log module 104. One example of control data is described in greater detail with regard to FIG. 4. The control data module 306, in one embodiment, determines at least a portion of the control data based on input from a user 112, such as a database administrator, a system administrator, or another user 112. In a further embodiment, the control data module 306 determines at least a portion of the control data based on default control data values, or the like. In one embodiment, the control data module 306 determines the control data during an initialization process for the database change log module 104 or during another configuration process. The control data module 306, in various embodiments, may store the control data in one or more control data database tables of the database 102, in one or more control data configuration files, or the like.

The control data module 306, in one embodiment, determines a selection of tracked fields and/or database tables 106 for the translation module 204 to use to encode field indicators for detected operations. In a further embodiment, the control data module 306 determines a log start date for the translation module 204 to use to encode time information of detected operations. The control data module 306, in another embodiment, determines a number of users 112 with access to a tracked database table 106 for the translation module 204 to use to encode information of users 112 associated with detected operations, such as a maximum number of users 112, a current number of users 112, or the like. In other embodiments, the control data module 306 may determine one or more other user preferences, such as whether or not to track read-only operations, one or more predefined retention periods, and/or other user preferences.

In one embodiment, the control data module 306 determines sizes for bit fields that the translation module 204 creates. In another embodiment, the control data module 306 determines positions for the consolidation module 206 to pack bit fields into in a bit array. The control data module 306, in a further embodiment, determines formats for one or more tracked database tables 106. In one embodiment, the control data module 306 assigns numbers, binary patterns, or other identifiers to tracked information, such as field names, usernames, database tables 106, and the like, to facilitate compact encoding of tracked information into bit fields using the assigned identifiers. Other control data for the control data module 306 to determine will be apparent to one of skill in the art, in view of this disclosure.

In one embodiment, the data privacy module 308 maintains separate access control for the change log 108 and tracked database tables 106. The data privacy module 308, in certain embodiments, may prevent one or more users 112 that have access to the change log 108 from accessing a tracked database table 106, so that the one or more users 112 may access bit arrays from the change log 108 but do not have access to actual data stored in records of the tracked database table 106. For example, in one embodiment, the data privacy module 308 may allow access to the change log 108 and deny access to production data database tables 106 to users 112 identified as support personnel, auditors, or the like. In one embodiment, the database change log module 104 does not store production data from tracked database tables 106 in the change log 108 and the data privacy module 308 prevents certain users 112 or groups of users 112 from accessing the tracked database tables 106 to keep potentially sensitive data in the tracked database tables 106 private.

The data privacy module 308, in certain embodiments, may prevent access to one or more tracked database tables 106 to satisfy legal requirements or industry regulations, such as Sarbanes Oxley Act requirements, HIPAA requirements, PCI DSS regulations, or the like, that mandate certain privacy rules or user access roles. The data privacy module 308, in one embodiment, uses native access control functionality of a DBMS or other database system of the database 102 to manage access to tracked database tables 106 and/or to the change log 108. In a further embodiment, the data privacy module 308 provides its own access controls, in a client 110 of the database 102, or the like.

FIG. 4 depicts one embodiment of control data 400. The control data 400, in the depicted embodiment, includes a table control table 402, a field control table 404, and a user control table 406. In other embodiments, the control data 400 may be stored in flat files or other data structures instead of or in addition to the depicted control data database tables 402, 404, 406.

In one embodiment, the table control table 402 defines one or more database tables 106 for the database change log module 104 to track and log operations. In the depicted embodiment, the table control table 402 includes a table identifier field 408, a table name field 410, a tracked fields field 412, a start date field 414, and a retention time field 416.

The table identifier field 408, in the depicted embodiment, stores a unique identifier for each database table 106 that the database change log module 104 tracks. The table identifier field 408, in a further embodiment, is a primary key or other key for the table control table 402. The table name field 410, in the depicted embodiment, stores the name of each database table 106 that the database change log module 104 tracks.

The tracked fields field 412, in the depicted embodiment, stores a bit field representing which fields in the corresponding database table 106 the database change log module 104 should track. A binary '0,' in the depicted embodiment, indicates that the database change log module 104 should not track the corresponding field while a binary '1' indicates that the database change log module 104 should track the corresponding field. The fields of tracked database tables 106, in the depicted embodiment, are defined in the field control table 404.

In the depicted embodiment, the field control table 404 includes the table identifier field 408, a field identifier field 418, and a field name field 420. In the depicted field control table 404, each field of tracked database tables 106 is defined by the table identifier 408 of the field's associated database table 106 and a field identifier field 418 that stores unique values for each tracked database table 106. The field identifier field 418, in one embodiment, indexes the fields of tracked database tables 106 in order for each database table 106. The tracked fields field 412 of the table control table 402, in one embodiment, stores bit fields ordered based on the field identifier field 418 values in the field control table 404. In the depicted embodiment, the field control table 404 also includes the name of each field of the tracked database tables 106 in the field name field 420.

The start date field 414, in the depicted embodiment, stores a start date for bit arrays associated with each tracked database table 106. The start dates stored in the start date field 414, in one embodiment, may be set separately for each tracked database table 106. In a further embodiment, the start dates stored in the start date field 414 are the same for each tracked database table 106. The retention time field 416 of the table control table 402, in the depicted embodiment, stores a number of days that the database change log module 104 should retain bit arrays (and/or other change log data) associated with each tracked database table 106.

In the depicted embodiment, the user control table 406 includes a user identifier field 422 and a username field 424. The user identifier field 422, in one embodiment, stores a unique identifier for each user 112 that may perform operations on a tracked database table 106, with the associated username of each user 112 stored in the username field 424.

In the depicted embodiment, the table control table 402 defines a single database table 106 for monitoring, with a table identifier 408 of "1," a table name 410 of "Patient," tracked fields 412 of "01111," a start date 414 of "Jan. 1, 2010," and a retention time 416 of "365." The field control table 404 defines the fields of the "Patient" database table 106, and the tracked fields 412 of "01111" indicate that the first field "Patient_ID" is not to be tracked, while the remaining fields are to be tracked. In one embodiment, the "Patient_ID" field may be a key for the "Patient" table, and tracking the field may be unnecessary.

FIG. 5A depicts one embodiment of an insert database operation 500, insert bit fields 510, and a change log table 520 based on the control data 400 of FIG. 4. The insert database operation 500, in the depicted embodiment, is an SQL insert statement and includes an associated date 502, an associated time 504, an associated user 506, and an operation body 508.

The operation event module 202, in one embodiment, detects the insert database operation 500 on the "Patient" database table 106 defined by the table control table 402 of FIG. 4. The translation module 204, in one embodiment, creates the insert bit fields 510 based on the detected insert database operation 500. In the depicted embodiment, the insert bit fields 510 include a date operation time bit field 512, a time operation time bit field 514, a user bit field 516, and a changed field bit field 518.

In the depicted embodiment, the translation module 204 encodes the associated date 502 as the date operation time bit field 512. The associated date 502 of the insert database operation 500, in the depicted embodiment, is "Jan. 1, 2010," which is the same day as the start date 414 for the "Patient" database table 106, so the translation module 204 encodes the date operation time bit field 512 as "000000000," an offset of zero from the start date 414.

The translation module 204, in one embodiment, uses nine bits for the date operation time bit field 512 to accommodate the retention time 416 of 365 days for the "Patient" database table 106, so that the date operation time bit field 512 is capable of storing offsets between 0 and 511 days. In the depicted embodiment, the time operation time bit field 514 has a value of "00110," a binary representation of the number six, which corresponds to the associated time 504 of "06:00" for the insert database operation 500.

In the depicted embodiment, the translation module 204 encodes the associated user 506 of "APP_USER1" to the user bit field 516 of "0001," the user identifier 422 corresponding to "APP_USER1" in the user control table 406. The translation module 204 encodes a changed field bit field 518 of "1111," in the depicted embodiment, because in an insert database operation 500, each field of the inserted record is new and therefore changed. Although the "Patient" database table 106 has five fields, the changed field bit field 518, in the depicted embodiment, has four bits, corresponding to the four tracked fields identified by the tracked fields field 412 in the table control table 402, without a bit for the untracked "Patient_ID" field.

The consolidation module 206, in the depicted embodiment, packs the date operation time bit field 512, the time operation time bit field 514, the user bit field 516, and the changed field bit field 518 into a single bit array of "000000000011000011111." The log module 208, in the depicted embodiment, stores the single bit array in a first record 528 of the change log table 520.

The change log table 520, in the depicted embodiment, includes a log identifier field 522, a record identifier field 524, and a bit array field 526. The log identifier field 522, in one embodiment, uniquely identifies bit arrays in the change log table 520. The record identifier field 524, in one embodiment, uniquely identifies the record that the associated operation is on. In the depicted embodiment, the record identifier field 524 of the first record 528 stores the "Patient_ID" field, the primary key from the "Patient" table. The log module 208, in the depicted embodiment, stores bit arrays in the bit array field 526.

FIG. 5B depicts one embodiment of an update database operation 530, update bit fields 540, and the change log table 520. The update database operation 530, in the depicted embodiment, is an SQL update statement and includes an associated date 502, an associated time 504, an associated user 506, and an operation body 508.

The operation event module 202, in one embodiment, detects the update database operation 530 on the "Patient" database table 106. The associated date 502 of the update database operation 530, in the depicted embodiment, is "Jan. 2, 2010," an offset of one day from the start date 414 for the "Patient" database table 106. The translation module 204, in the depicted embodiment, encodes the associated date 502 as a date operation time bit field 512 of "000000001," representing an offset of one day from the start date 414. The translation module 204, in the depicted embodiment, encodes the associated time 504 of "07:00" as a time operation time bit field 514 of "00111."

In the depicted embodiment, the translation module 204 encodes the associated user 506 of "APP_USER2" to the user bit field 516 of "0010," which is a binary representation of the user identifier 422 corresponding to "APP_USER2" in the user control table 406. The translation module 204, in the depicted embodiment, determines that the update database operation 530 is configured to change the "status" field of the "Patient" database table 106, and encodes the "status" field as a changed field bit field 518 of "0001," the last bit of the changed field bit field 518 corresponding to the "status" field. The operation body 508, in the depicted embodiment, includes the field name 420 of "status."

The consolidation module 206, in the depicted embodiment, packs the date operation time bit field 512, the time operation time bit field 514, the user bit field 516, and the changed field bit field 518 into a single bit array and the log module 208 stores the single bit array in the bit array field 526 of a second record 532 in the change log table 520. The second record 532, in the depicted embodiment, has a different log identifier field 522 than the first record 528 and has the same record identifier field 524, since the insert database operation 500 created the record and the update database operation 530 changed a field of the record.

FIG. 5C depicts one embodiment of a select database operation 550, select bit fields 560, and the change log table 520. In the depicted embodiment, the select database operation 550 is a read-only SQL select operation that does not change a field of a record in the "Patient" database table 106. The select database operation 550 includes an associated date 502, an associated time 504, an associated user 506, and an operation body 508.

In one embodiment, the translation module 204 creates the select bit fields 560 in substantially the same manner as described above with regard to the insert bit fields 510 and the update bit fields 540. The translation module 204, in the depicted embodiment, encodes the associated date 502 to the date operation time bit field 512, encodes the associated time 504 to the time operation time bit field 514, and encodes the associated user 506 to the user bit field 516.

Because, in the depicted embodiment, the select database operation 550 does not change any fields of a record in the "Patient" database table 106, the translation module 204 encodes the changed fields as a changed field bit field 518 of "0000," indicating that the select database operation 550 is not configured to change any fields of the associated record. The consolidation module 206 packs the select bit fields 560 into a single bit array, in the depicted embodiment, and the log module 208 stores the single bit array, with a log indicator 522 and a record indicator 524, in a third record 534 of the change log table 520.

FIG. 5D depicts one embodiment of operation type bit fields 570 and the change log table 520. The operation type bit fields 570, in the depicted embodiment, are for the select database operation 550 and include the select bit fields 560 with the addition of an operation type bit field 536.

The translation module 204, in the depicted embodiment, encodes the "SELECT" operation type of the select database operation 550 with the operation type bit field 536 of "11." For example, in one embodiment, the translation module 204 may encode an "INSERT" operation type as "00," an "UPDATE" operation type as "01," a "DELETE" operation type as "10," and a "SELECT" operation type as "11," or may use a different combination of unique indicators as operation type bit fields 536.

In the depicted embodiment, the consolidation module 206 has packed an operation type bit field 536 on the end of each bit array 526 in the change log table 520, adding a "00" operation type bit field 536 to the first record 528 for the insert database operation 500, a "01" operation type bit field 536 to the second record 532 for the update database operation 530, and adding a "11" operation type bit field 536 to the third record 534 for the select database operation 550. The consolidation module 206, in other embodiments, may pack the bit fields 510, 540, 560, 570 in different orders, the translation module 204 may create bit fields 510, 540, 560, 570 with different sizes, and the like, as will be apparent to one of skill in the art in view of this disclosure.

Figure 6:
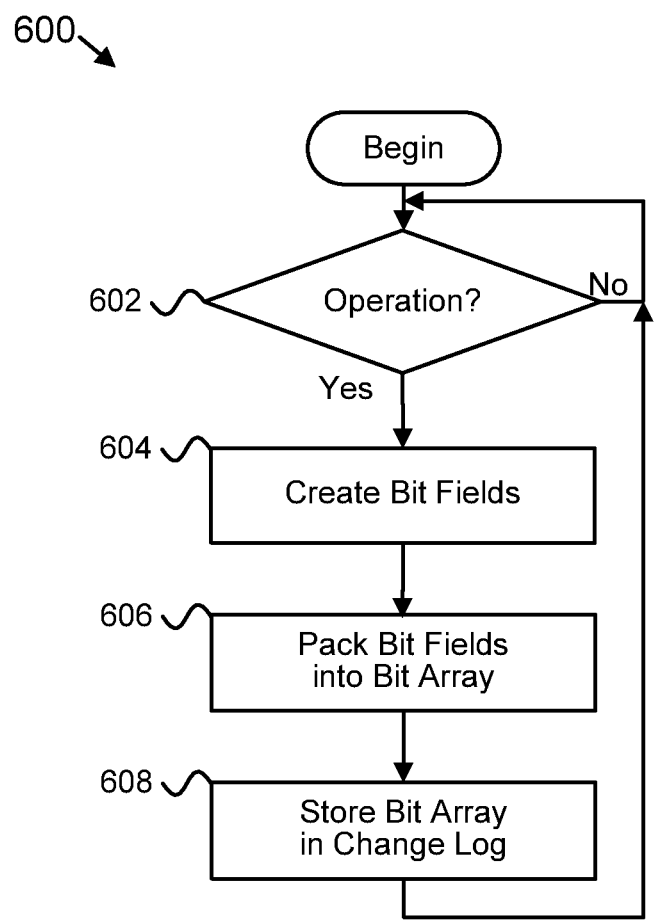
FIG. 6 is a schematic flow chart diagram illustrating one embodiment of a method for logging operations for a database in accordance with the present invention.

FIG. 6 depicts a method 600 for logging operations for the database 102. In the depicted embodiment, the method 600 begins and the operation event module 202 determines 602 whether there is an operation on a record of a tracked database table 106. If the operation event module 202 does not detect 602 an operation, in the depicted embodiment, the operation event module 202 continues to monitor 602 the database 102 for operations on one or more tracked database tables 106.

If the operation event module 202 detects 602 an operation on a record of a tracked database table 106, in the depicted embodiment, the translation module 204 creates 604 one or more bit fields for the detected 602 operation, such as a changed field bit field, one or more operation time bit fields, a user bit field, and the like. The consolidation module 206 packs 606 the bit fields into a bit array and the log module 208 stores 608 the bit array in a change log 108. In the depicted embodiment, the method 600 returns to the operation detection step 602 and the operation event module 202 continues to monitor 602 the database 102 for operations on one or more tracked database tables 106.

Figure 7:
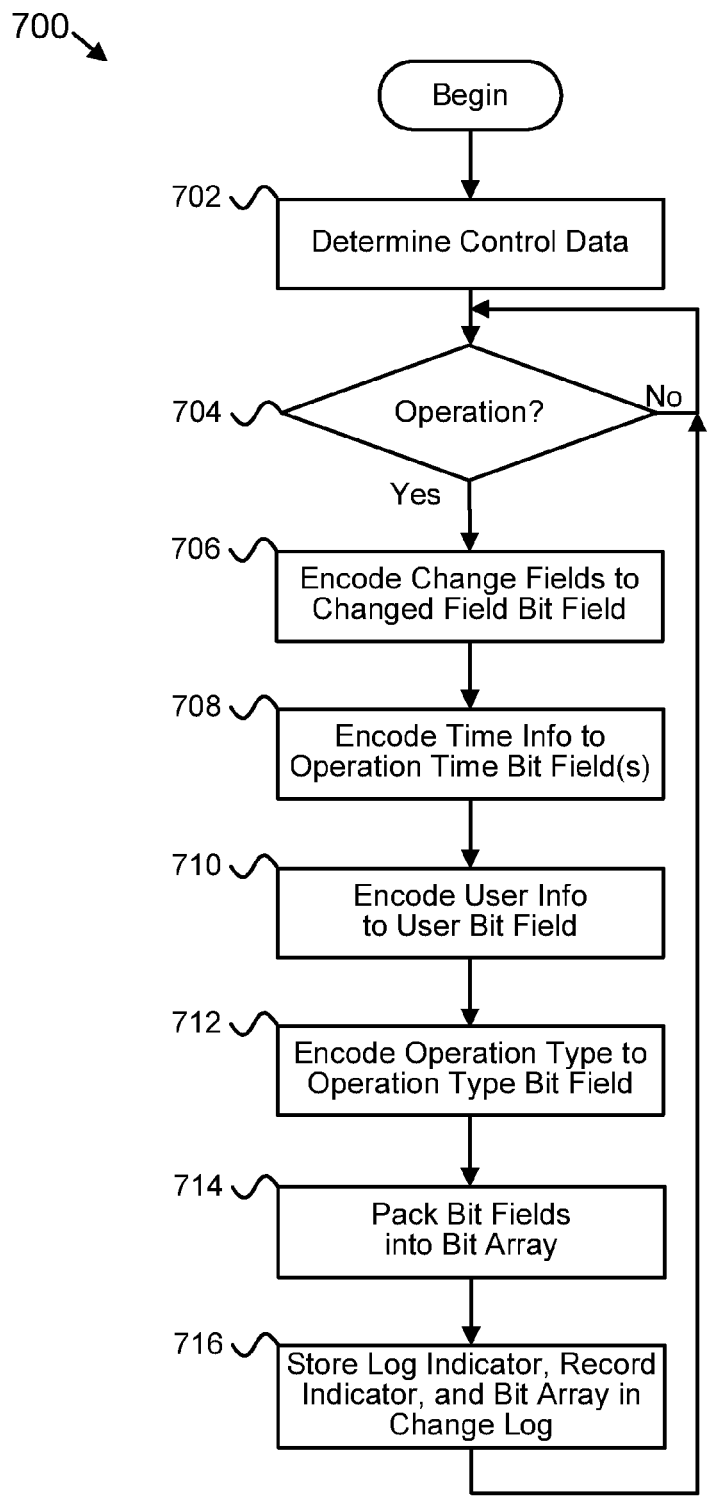
FIG. 7 is a schematic flow chart diagram illustrating another embodiment of a method for logging operations for a database in accordance with the present invention.

FIG. 7 depicts another embodiment of a method 700 for logging operations for the database 102. In the depicted embodiment, the method 700 begins and the control data module 306 determines 702 control data for the database change log module 104. Examples of control data that the control data module 306 may determine 702 are described above with regard to FIG. 3. The operation event module 202 determines 704, in the depicted embodiment, whether there is an operation on a record of a tracked database table 106. If the operation event module 202 does not detect 704 an operation, in the depicted embodiment, the operation event module 202 continues to monitor 704 the database 102 for operations on one or more tracked database tables 106.

If the operation event module 202 detects 704 an operation on a record of a tracked database table 106, in the depicted embodiment, the translation module 204 encodes 706 indicators of one or more fields that the detected 704 operation is configured to change as a changed field bit field. The translation module 204, in the depicted embodiment, encodes 708 time information for the detected 704 operation as one or more operation time bit fields and encodes 710 information of a user 112 associated with the detected 704 operation as a user bit field. In the depicted embodiment, the translation module 204 encodes 712 an operation type of the detected 704 operation as an operation type bit field.

The consolidation module 206 packs 714 the bit fields into a bit array, in the depicted embodiment. The log module 208, in the depicted embodiment, stores 716 a log indicator, a record indicator, and the bit array in a change log 108. In the depicted embodiment, the method 700 returns to the operation detection step 704 and the operation event module 202 continues to monitor 704 the database 102 for operations on one or more tracked database tables 106.

Figure 8:
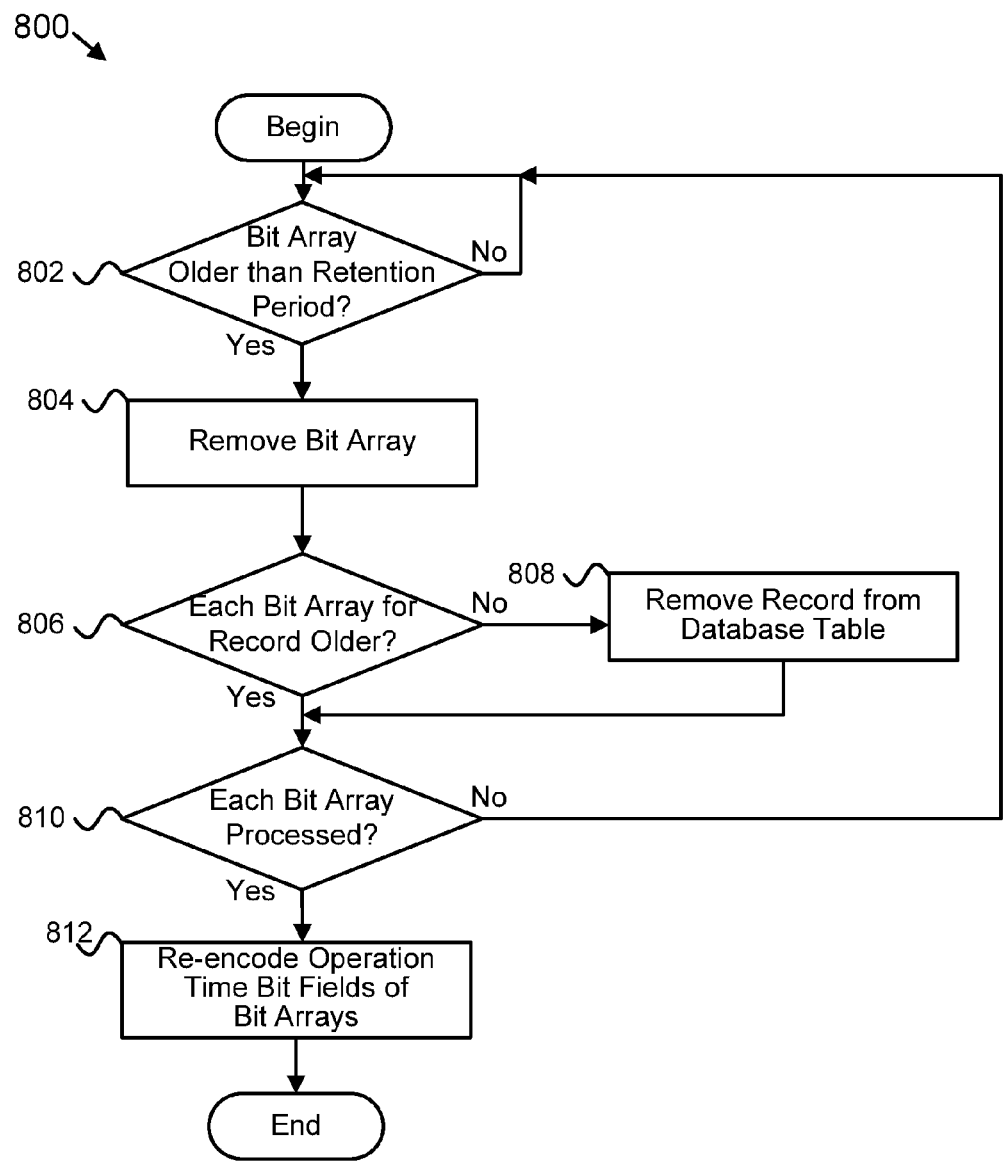
FIG. 8 is a schematic flow chart diagram illustrating one embodiment of a method for purging a database change log in accordance with the present invention.

FIG. 8 depicts one embodiment of a method 800 for purging a change log 108. As described above with regard to the purge module 304 of FIG. 3, a purging method 800, in various embodiments, may be performed periodically, upon insertion of a bit array into the change log 108, during off-peak hours, or the like. In one embodiment, purging records in the change log 108 older than a predefined retention period allows the size of one or more operation time bit fields to be minimized.

In the depicted embodiment, the method 800 begins and the purge module 304 determines 802 whether an operation time bit field of a stored bit array from the change log 108 indicates that the stored bit array is older than a predefined retention period. If, in the depicted embodiment, the purge module 304 determines 802 that the stored bit array is not older than the predefined retention period, the purge module 304 advances to another stored bit array in the change log 108, and determines 802 whether the other stored bit array is older than the predefined retention period.

If, in the depicted embodiment, the purge module 304 determines 802 that the stored bit array is older than the predefined retention period, the purge module 304 removes 804 the bit array from the change log 108. The purge module 304, in the depicted embodiment, determines 806 whether each bit array in the change log 108 for a base record corresponding to the removed 804 bit array is older than the predefined retention period. In one embodiment, the purge module 304 determines 806 that each bit array in the change log 108 for the record were older than the predefined retention period by determining 806 that each bit array for the record has been removed 804 from the change log 108.

In the depicted embodiment, if the purge module 304 determines 806 that each bit array for the base record is older than the predefined retention period, the purge module 304 removes 808 the base record from the corresponding tracked database table 106 and the method 800 continues. The purge module 304, in the depicted embodiment, determines 810 whether the purge module 304 has performed purge processing on each bit array in the change log 108.

If, in the depicted embodiment, the purge module 304 determines 810 that the purge module 304 has not yet performed purge processing on each bit array in the change log 108, the purge module 304 advances to another stored bit array in the change log 108 and determines 802 whether the other stored bit array is older than the predefined retention period. If, in the depicted embodiment, the purge module 304 determines 810 that the purge module 304 has performed purge processing on each bit array in the change log 108, the purge module 304 re-encodes 812 one or more operation time bit fields of one or more stored bit arrays that remain in the change log 108 and the method 800 ends.

In one embodiment, the purge module 304 re-encodes the operation time bit fields from offsets based on an original start date to offsets based on a new start date associated with the predefined retention period. In a further embodiment, the purge module 304 re-encodes 812 an operation time bit field of each stored bit array of the change log 108 as it processes the change log 108, for example, in response to determining 802 that a stored bit array is not older than the predefined retention period, or the like.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes," "has," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus to log operations for a database, the apparatus comprising:
    an operation event module that detects an operation on a record in a database table;
    a translation module that creates a changed field bit field, one or more operation time bit fields, and a user bit field, the translation module creating the changed field bit field by encoding indicators of one or more fields of the record that the operation is configured to change, creating the one or more operation time bit fields by encoding time information for the operation, and creating the user bit field by encoding information of a user associated with the operation;
    a consolidation module that packs at least the changed field bit field, the one or more operation time bit fields, and the user bit field into a single bit array; and
    a log module that stores the bit array in a change log such that the bit array is associated with the record.

2. The apparatus of claim 1, further comprising a purge module that removes a stored bit array from the change log in response to the one or more operation time bit fields of the stored bit array indicating that the stored bit array is older than a predefined retention period.

3. The apparatus of claim 2, wherein the purge module further removes a stored record from the database table in response to time indicators of each stored bit array associated with the stored record indicating that each stored bit array is older than the predefined retention period.

4. The apparatus of claim 2, wherein the purge module further re-encodes one or more operation time bit fields for one or more additional stored bit arrays in response to removing the stored bit array, the purge module re-encoding the one or more operation time bit fields from offsets based on an original start date to offsets based on a new start date associated with the predefined retention period.

5. The apparatus of claim 1, further comprising a control data module that determines control data for the translation module, the control data comprising a selection of tracked fields of the database table for the translation module to use to encode the indicators of one or more fields of the record, a log start date for the translation module to use to encode the time information, and a number of users with access to the database table for the translation module to use to encode the information of the user.

6. The apparatus of claim 1, further comprising a read operation module that detects a second operation on the record in the database table, the second operation not configured to change a field of the record, wherein the translation module creates one or more second operation time bit fields and a second user bit field, the consolidation module packs at least the one or more second operation time bit fields and the second user bit field into a second bit array and the log module stores the second bit array in the change log such that the second bit array is associated with the record.

7. The apparatus of claim 6, wherein the translation module further creates a second changed field bit field, the second changed field bit field indicating that no fields of the record were changed by the second operation.

8. The apparatus of claim 1, wherein the translation module creates an operation type bit field by encoding an operation type for the operation, the consolidation module packing the operation type bit field into the bit array.

9. The apparatus of claim 1, wherein the change log comprises a change log database table.

10. The apparatus of claim 9, further comprising a data privacy module that prevents one or more users with access to the change log database table from accessing the database table of the record such that the one or more users have access to the changed field bit field, the one or more operation time bit fields, and the user bit field of the bit array and do not have access to data of the record.

11. The apparatus of claim 9, wherein the log module stores a record indicator and a log indicator with the bit array in the change log database table, the record indicator, the log indicator, and the bit array each comprising separate fields in the change log database table, the record indicator identifying the record that the operation is on, and the log indicator uniquely identifying the bit array and the record indicator in the change log database table.

12. The apparatus of claim 1, wherein the change log comprises a field in the database table of the record and the log module stores the bit array as a field of the record.

13. The apparatus of claim 1, wherein the change field bit field comprises a bitwise representation of one or more preselected tracked fields for the database table, each bit of the bitwise representation indicating whether the detected operation is configured to change an associated preselected tracked field of the record, the field indicator excluding bits for untracked fields of the database table.

14. The apparatus of claim 1, wherein a date operation time bit field from the one or more operation time bit fields comprise a binary representation of an offset number of days between a log start date and a date of the detected operation, the date operation time bit field having a number of bits selected based on a predefined retention period.

15. The apparatus of claim 14, wherein a time operation time bit field from the one or more operation time bit fields comprises a binary representation of a time of day for the detected operation.

16. The apparatus of claim 1, wherein the user bit field comprises a binary representation of a user identifier of the user associated with the operation, the user bit field having a number of bits selected based on a predefined maximum number of users.

17. The apparatus of claim 1, further comprising a database server computer hosting a database system, the database system storing the database table.

18. A method for logging operations for a database, the method comprising:
   detecting an operation on a record in a database table;
   creating a changed field bit field by encoding indicators of one or more fields of the record that the operation is configured to change;
   creating one or more operation time bit fields by encoding time information for the operation;
   creating a user bit field by encoding information of a user associated with the operation;
   packing at least the changed field bit field, the one or more operation time bit fields, and the user bit field into a single bit array; and
   storing the bit array in a change log such that the bit array is associated with the record.

19. The method of claim 18, further comprising,
   removing a stored bit array from the change log in response to the one or more operation time bit fields of the stored bit array indicating that the stored bit array is older than a predefined retention period; and
   re-encoding one or more operation time bit fields for one or more additional stored bit arrays in response to removing the stored bit array, the one or more operation time bit fields re-encoded from offsets based on an original start date to offsets based on a new start date associated with the predefined retention period.

20. The method of claim 18, further comprising preventing one or more users with access to the change log from accessing the database table of the record such that the one or more users have access to the changed field bit field, the one or more operation time bit fields, and the user bit field of the bit array and do not have access to data of the record.

21. The method of claim 18, further comprising,
   detecting a second operation on the record in the database table, the second operation not configured to change a field of the record;
   creating one or more second operation time bit fields;
   creating a second user bit field;
   packing at least the one or more second operation time bit fields and the second user bit field into a second bit array; and
   storing the second bit array in the change log such that the second bit array is associated with the record.

22. A computer program product comprising a non-transitory computer readable medium having computer readable program code executing to perform operations for logging operations for a database, the operations of the computer program product comprising:
   detecting an operation on a record in a database table;
   creating a changed field bit field by encoding indicators of one or more fields of the record that the operation is configured to change;
   creating one or more operation time bit fields by encoding time information for the operation;
   creating a user bit field by encoding information of a user associated with the operation;
   packing at least the changed field bit field, the one or more operation time bit fields, and the user bit field into a single bit array; and
   storing the bit array in a change log such that the bit array is associated with the record.

23. The computer program product of claim 22, further comprising,
   removing a stored bit array from the change log in response to the one or more operation time bit fields of the stored bit array indicating that the stored bit array is older than a predefined retention period; and
   re-encoding one or more operation time bit fields for one or more additional stored bit arrays in response to removing the stored bit array, the one or more operation time bit fields re-encoded from offsets based on an original start date to offsets based on a new start date associated with the predefined retention period.

24. The computer program product of claim 22, further comprising preventing one or more users with access to the change log from accessing the database table of the record such that the one or more users have access to the changed field bit field, the one or more operation time bit fields, and the user bit field of the bit array and do not have access to data of the record.

25. A method for deploying computing infrastructure, the method comprising:

integrating computer readable code into a computing system, wherein the computer readable code in combination with the computing system is capable of, detecting an operation on a record in a database table;

creating a changed field bit field by encoding indicators of one or more fields of the record that the operation is configured to change;

creating one or more operation time bit fields by encoding time information for the operation;

creating a user bit field by encoding information of a user associated with the operation;

packing at least the changed field bit field, the one or more operation time bit fields, and the user bit field into a single bit array; and storing the bit array in a change log such that the bit array is associated with the record.

\* \* \* \* \*